United States Patent
Burzio

(10) Patent No.: US 8,269,601 B2
(45) Date of Patent: Sep. 18, 2012

(54) MULTIUSER VEHICLE UTILIZATION SYSTEM AND ELECTRONIC KEY THEREOF

(75) Inventor: Gianfranco Burzio, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 13/031,046

(22) Filed: Feb. 18, 2011

(65) Prior Publication Data

US 2011/0264304 A1    Oct. 27, 2011

Related U.S. Application Data

(63) Continuation-in-part of application No. 11/083,818, filed on Mar. 18, 2005, now abandoned.

(30) Foreign Application Priority Data

Mar. 30, 2004   (EP) .................................. 04425226

(51) Int. Cl.
*G06F 17/00* (2006.01)
(52) U.S. Cl. ....... 340/5.6; 340/5.24; 340/5.61; 340/5.64
(58) Field of Classification Search .................. 340/5.6, 340/5.61, 5.62, 5.63, 5.64, 5.72, 5.21, 5.24, 340/4.11, 12.22, 5.2, 5.3, 5.66; 701/1, 2, 701/32, 33, 34, 35, 49
See application file for complete search history.

(56) References Cited

U.S. PATENT DOCUMENTS

| | | | |
|---|---|---|---|
| 6,275,231 B1 * | 8/2001 | Obradovich | 345/156 |
| 6,700,479 B2 * | 3/2004 | Birchfield | 340/426.14 |
| 2001/0049569 A1 * | 12/2001 | Gehrke | 701/1 |
| 2003/0080850 A1 * | 5/2003 | Kline | 340/5.6 |
| 2003/0231550 A1 * | 12/2003 | Macfarlane | 367/198 |
| 2005/0099265 A1 * | 5/2005 | Dix et al. | 340/5.72 |
| 2007/0210896 A1 * | 9/2007 | Schambeck et al. | 340/5.72 |

* cited by examiner

*Primary Examiner* — Nabil Syed

(74) *Attorney, Agent, or Firm* — Winston & Strawn LLP

(57) ABSTRACT

A vehicle utilization system and method permitting use of vehicles having respective identification codes includes a key having a memory for storing enabling codes enabling use of the vehicles; and an enabling device, in each vehicle, permitting use of the vehicle by a user in possession of the key, if the enabling code stored in the key meets given conditions. The system also includes a programming device for generating the enabling codes as a function of the identification codes of the vehicles, and for storing the generated enabling codes in the key.

16 Claims, 3 Drawing Sheets

MULTIUSER VEHICLE UTILIZATION SYSTEM AND ELECTRONIC KEY THEREOF

PRIORITY

This application is a continuation-in-part of, and claims priority to, co-pending U.S. Non-Provisional application Ser. No. 11/083,818, entitled "MULTIUSER VEHICLE UTILIZATION SYSTEM AND ELECTRONIC KEY THEREFOR," filed on Mar. 18, 2005, also naming Gianfranco Burzio as sole inventor, which is hereby incorporated by reference in its entirety.

FIELD OF THE INVENTION

The present invention relates to a multiuser vehicle utilization system, and to an electronic key therefore.

BACKGROUND

Most vehicles currently feature conventional mechanical keys for access to the vehicle (unlocking and locking the doors) and turning on the engine, and which are normally associated with a door lock/release remote control. Recently, more advanced vehicle utilization systems, based on radio-frequency identification devices, have been proposed for use either in conjunction with or instead of conventional mechanical key systems. More specifically, such systems comprise a radio-frequency transmitter for transmitting an identification code, and an on-vehicle receiving unit which compares the incoming identification code with a code stored on the vehicle. In the event of a match, i.e. positive identification, the system releases the vehicle doors, and may also enable other vehicle functions, such as starting the engine, which may be done, for example, by pressing a button or turning an ignition knob.

The identification code may be stored in an electronic medium which may be combined with the radio-frequency transmitter to form an electronic key; and the electronic key may, for example, be in compact form, similar to a credit card, to be carried easily by the user. In the case of vehicle fleets, such as company cars, hire cars and similar, the same vehicle may be used by various users, each with a respective key. In this case, a table is stored on the vehicle containing a number of identification codes, each for enabling a respective electronic key to permit use of the vehicle.

Other data, besides the user identification code, is also known to be stored in the electronic key. For example, data relative to different authorization levels governing use of a given vehicle is known to be stored, so that the vehicle is only enabled, for example, for use during certain hours of the day, or for a limited mileage, or a limited number of days.

Another recent proposal is to store personal data in an electronic key, such as driver's seat, rearview mirror, car radio, or air conditioning settings, so that, by reading the personal data, the vehicle settings can be adjusted automatically in one operation.

All the above utilization systems are characterized by each key being assigned one identification code and related data. Consequently, the holder of an electronic key is only allowed access to a vehicle if the identification code of the electronic key is included in the code table stored on the vehicle. Conversely, to enable use of the vehicle, the user must be supplied with another electronic key whose identification code is stored in the on-vehicle code table. Consequently, though in possession of a personal electronic key containing personal data relative to on-vehicle device preferences or settings, the user is unable to take advantage of them by having to use another key.

Accordingly, there is a need in the art for a vehicle utilization system designed to eliminate the drawbacks of known systems.

SUMMARY OF THE INVENTION

Exemplary embodiments of the present invention provide a vehicle utilization system and method permitting use of vehicles having respective identification codes. The system includes a key having a memory for storing enabling codes enabling use of the vehicles; and an enabling device, in each vehicle, permitting use of the vehicle by a user in possession of the key, if the enabling code stored in the key meets given conditions. Once the user enters the vehicle, various devices in the vehicle can be adjusted automatically based upon data stored on the key. In addition, the device settings are stored on the key in real time. The system also includes a programming device for generating the enabling codes as a function of the identification codes of the vehicles, and for storing the generated enabling codes in the key.

DESCRIPTION OF ILLUSTRATIVE EMBODIMENTS

Illustrative embodiments and related methodologies of the present invention are described below as they might be employed in an electronic key and associated system. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
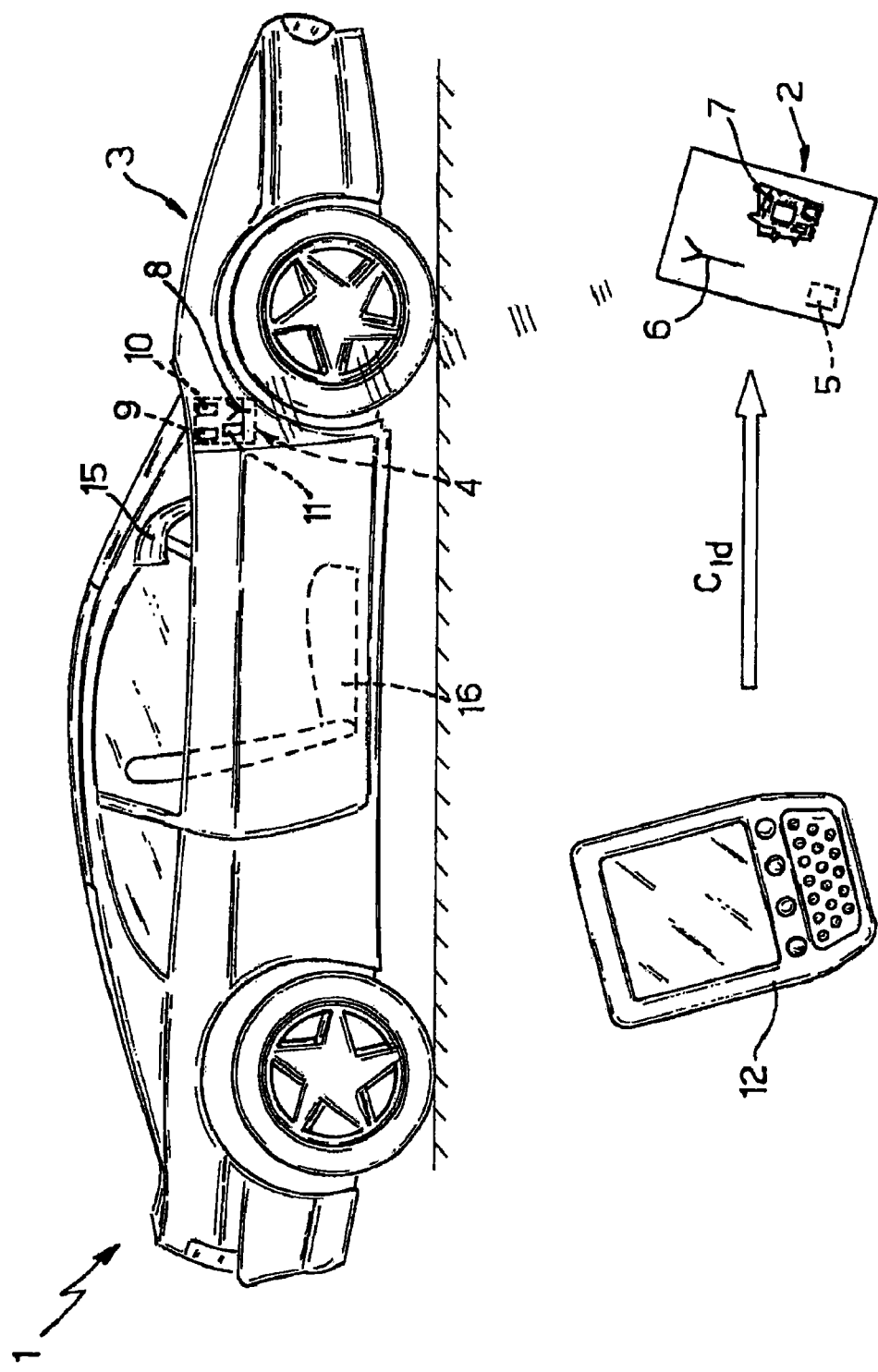
FIG. 1 shows schematically a vehicle utilization system in accordance with the teachings of the present invention.

As shown in FIG. 1, a vehicle utilization system 1, in accordance with an exemplary embodiment of the present invention, comprises a portable electronic key 2 carried by a user wishing to use a vehicle 3; an enabling device 4 on vehicle 3; and a computer 12, e.g. a personal computer (desktop or laptop) or a PDA (Personal Digital Assistant). More specifically, computer 12 may preferably be in the form of a PDA already owned by the user. Electronic key 2 comprises an electronic microprocessor circuit 7 associated with at least one memory 5 and with a known radio-frequency transceiver 6 (operable as a wireless transmitter or a receiver, according to the specific operating conditions), which cooperate with electronic microprocessor circuit 7.

In this exemplary embodiment, memory 5 stores one or more enabling codes $C_{id}$ (as explained in detail later on), and personal data $D_{pers}$ relative to adjustable on-vehicle device settings, such as an automatic rearview mirror 15, an automatic driver's seat 16, an air conditioning system, car radio, and satellite navigation system (here not shown in the drawing). The personal data $D_{pers}$ may also comprise the directory of an on-vehicle cellular telephone (not shown) or music in compressed digital format (e.g. MP3).

In one possible embodiment, electronic key 2 is in the form of a credit card, and is inserted in an electronic card reader (not shown) of computer 12. In an alternative embodiment (not shown), electronic key 2 is in the form of a USB key, and is interfaced in known manner with computer 12.

On-vehicle enabling device 4 comprises an electronic circuit with at least a known radio-frequency transceiver 8, e.g. for receiving the data transmitted by transceiver 6 in the electronic key 2; a processing unit 9 for processing the incoming data; a comparator 10; and an actuator 11. By means of dedicated software, computer 12 generates enabling codes $C_{id}$, and, when interfaced in known manner with electronic key 2, transfers them to memory 5 of electronic key 2, where the enabling codes $C_{id}$ are stored. The software may, for example, be developed by the maker of vehicle 3 and supplied to the user (e.g. in an optical medium) upon purchase of vehicle 3.

According to one aspect of the present embodiment, each vehicle 3 is assigned a single identification code $C_{veh}$, e.g. during manufacture or upon sale, and the identification code $C_{veh}$ is processed by computer 12 to generate an enabling code $C_{id}$ which is stored in the user's electronic key 2, is transmitted to on-vehicle enabling device 4, and is subsequently processed and recognized to enable use of vehicle 3 by the user by means of electronic key 2.

In actual use, electronic key 2 initially contains no enabling code $C_{id}$ (though personal data $D_{pers}$ may be assumed to be already stored in known manner in memory 5). More specifically, personal data $D_{pers}$ may be already stored by computer 12 by means of specific application software (especially as regards, for example, the telephone directory, music, and similar).

To enable electronic key 2 to use vehicle 3, electronic key 2 is interfaced with computer 12 according to the characteristics of the key (USB or credit card type key). The software of computer 12 then retrieves the single identification code $C_{veh}$ of vehicle 3 (the code may already reside in the software, or may be entered manually, e.g. from the keyboard of computer 12, or may be received over a protected link to an internet data bank), and proceeds to generate an enabling code $C_{id}$ by processing the input data. The enabling code $C_{id}$ generated is then stored in memory 5 of electronic key 2.

The above input data comprises the identification code $C_{veh}$ of vehicle 3 and other information which may usefully be associated with the enabling code $C_{id}$ generated by computer 12, such as a particular authorization level for use of vehicle 3. For example, enabling code $C_{id}$ may be associated with a limited time period or authorization for use of only some of the functions of vehicle 3. This is particularly useful in the case of car hire or company car fleets (for example, electronic key 2 may be enabled for only a particular time period or a given mileage, or an employee may be permitted use of the vehicle but not the on-vehicle entertainment facilities). Once the time period governing use of the vehicle or the set mileage runs out, the enabling code $C_{id}$ is invalidated, and electronic key 2 is no longer enabled to use vehicle 3.

The software of computer 12 may advantageously employ a graphic menu system, by which the enabling code $C_{id}$ can be stored quickly and easily in electronic key 2 together with data relative to the authorization level for use of vehicle 3. Whichever the case, the holder of electronic key 2 may be totally unaware of the enabling code $C_{id}$ generating process, and, in particular, need not necessarily know the identification code $C_{veh}$ of vehicle 3.

Generation of the enabling code $C_{id}$ must of course be authorized by the owner of vehicle 3 or the management of the vehicle fleet, e.g. car hire firm, of which vehicle 3 forms part. Only when authorization is given, e.g. by means of a password system, can an enabling code $C_{id}$ recognizable by vehicle 3 be stored in electronic key 2. For data transmission security reasons, enabling code $C_{id}$ generated by computer 12 may advantageously be encrypted (in known manner), e.g. by means of a public key and a private key. Computer 12 in fact can generate a potentially unlimited number of encrypted enabling codes $C_{id}$ from the same identification code $C_{veh}$ of vehicle 3.

To prevent the transmitted code from being intercepted by radio receivers and used for subsequent access to vehicle 3, known strategies are used so that codes transmitted by radio transmission differ at each use ("rolling code" technique, for example). To operate a vehicle 3 in the vehicle utilization system 1, the user of vehicle 3 first transmits the enabling code $C_{id}$ stored in the memory 5 by means of transceiver 6 of electronic key 2. This may be done in either active or passive mode. In active transmission mode, transmission is activated by the user, e.g. by pressing a button (not shown) on electronic key 2. In passive transmission mode, transmission is activated as the holder of electronic key 2 approaches vehicle 3, e.g. by means of a known enabling system sensitive to electromagnetic fields.

Transceiver 8 of on-vehicle enabling device 4 receives and sends the enabling code $C_{id}$ to processing unit 9, which processes enabling code $C_{id}$ and any associated data. It should be pointed out that data can be transmitted by transceiver 6 to transceiver 8 in any known manner, and in particular using any known data transmission protocol. According to one aspect of the present invention, transceiver 8 is conveniently designed to successfully receive data transmitted by transceivers 6 of various electronic keys 2, so that a single data transmission standard, common to various vehicle manufacturers, would be to advantage.

Given the above aspect of the invention, electronic key 2 is therefore universal by permitting use of any vehicle, after programming an appropriate enabling code $C_{id}$ obtained by processing the vehicle identification code $C_{veh}$. If the enabling code $C_{id}$ is already encrypted, processing unit 9 decrypts it to generate a decrypted code. More specifically, only processing unit 9 can decrypt the enabling code $C_{id}$ transmitted by electronic key 2, e.g. since only the processing unit knows the private key with which the enabling code was encrypted. The decrypted code is then compared with the vehicle identification code $C_{veh}$ by comparator 10, which generates a positive-value logic signal in the event of positive identification of the user.

The logic signal generated by the comparator 10 commands actuator 11, which enables use of vehicle 3 by the user—in particular, enables the user to unlock the doors and/or turn on the engine—and adjusts the adjustable on-vehicle devices to the user's preference, which involves reading the personal data $D_{pers}$ stored in memory 5 of electronic key 2. Actuator 11 also enables use of the vehicle according to the authorization level associated with the enabling code $C_{id}$ of electronic key 2, e.g. only for a given mileage or a given length of time. At any time, the user may obviously alter the adjustable device settings made automatically on the basis of the data stored in electronic key 2. For this reason, the vehicle may advantageously be equipped with storing means (not shown in FIG. 1) connected operationally to electronic key 2 to automatically store the latest settings (i.e. the settings as last modified by the user in the vehicle 3) within the electronic key 2. The same storing means also store the personal data $D_{pers}$ (or part of it) the first time the user uses electronic key 2.

Figure 2:
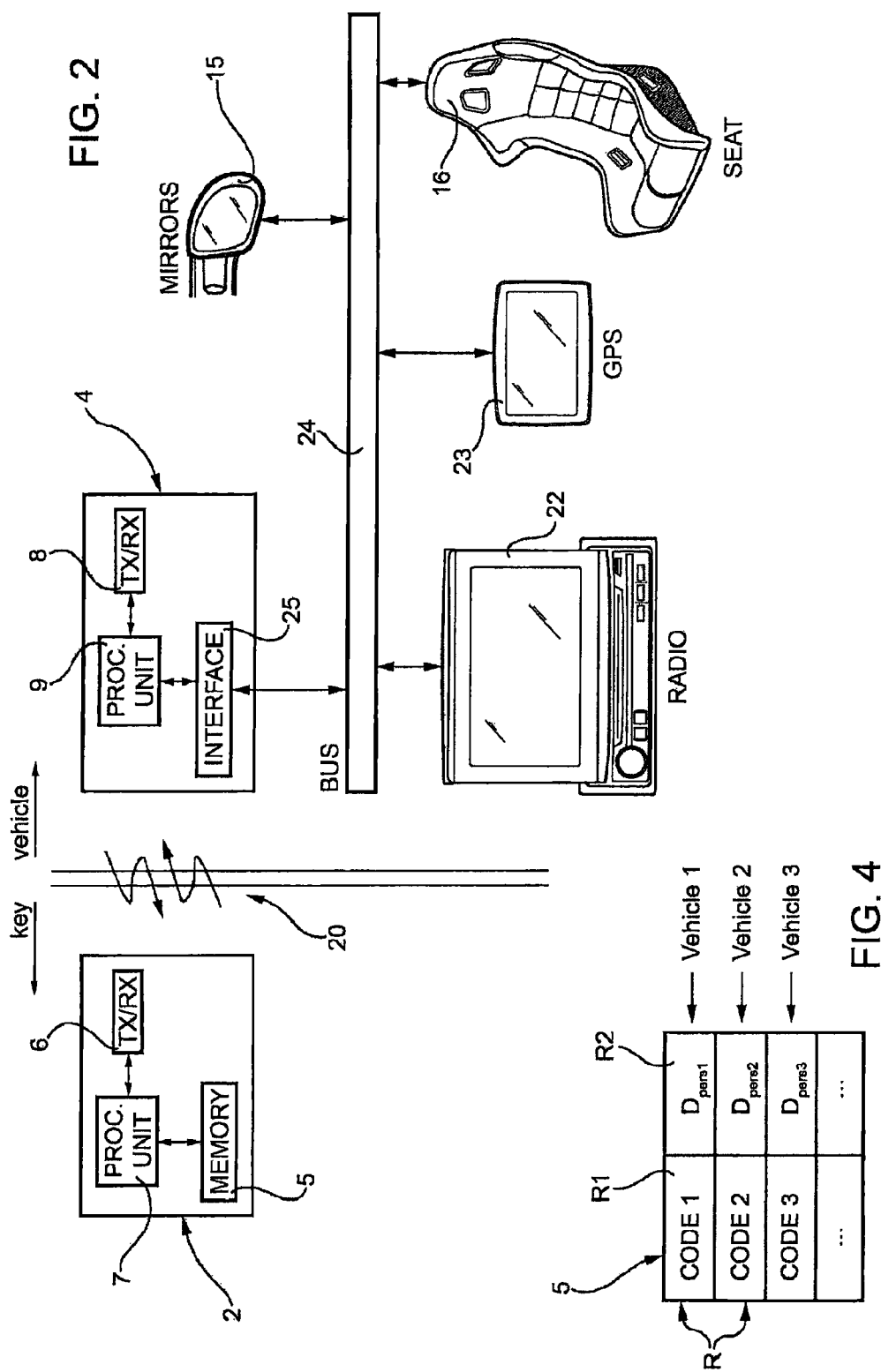
FIG. 2 shows a block diagram of part of the vehicle utilization system.

An exemplary embodiment of the above discussed cooperation of the electronic key 2 and on-vehicle processing unit 9 for management of personal data $D_{pers}$ will now be described. An exemplary block diagram of vehicle utilization system 4 and various coupled devices is illustrated in FIG. 2. Transceiver 6 of the electronic key 2 exchanges data with the transceiver 8 of the processing unit 9 via a wireless communication link 20, by means of a very close distance radio transmission or short range communication protocol, such as Bluetooth or ZigBee.

On board the vehicle 3, the processing unit 9 exchanges data with the adjustable on-vehicle devices (in particular with respective control units), such as the automatic rear-view mirror 15, automatic driver's seat 16, radio 22, or satellite navigation system 23, through a communication bus 24, such as a CAN bus. A bus interface 25 is provided in the enabling device 4 for interfacing the processing unit 9 with the communication bus 24. In particular, data communication between the processing unit 9 and the on-vehicle devices is of the bidirectional type.

Figure 3:
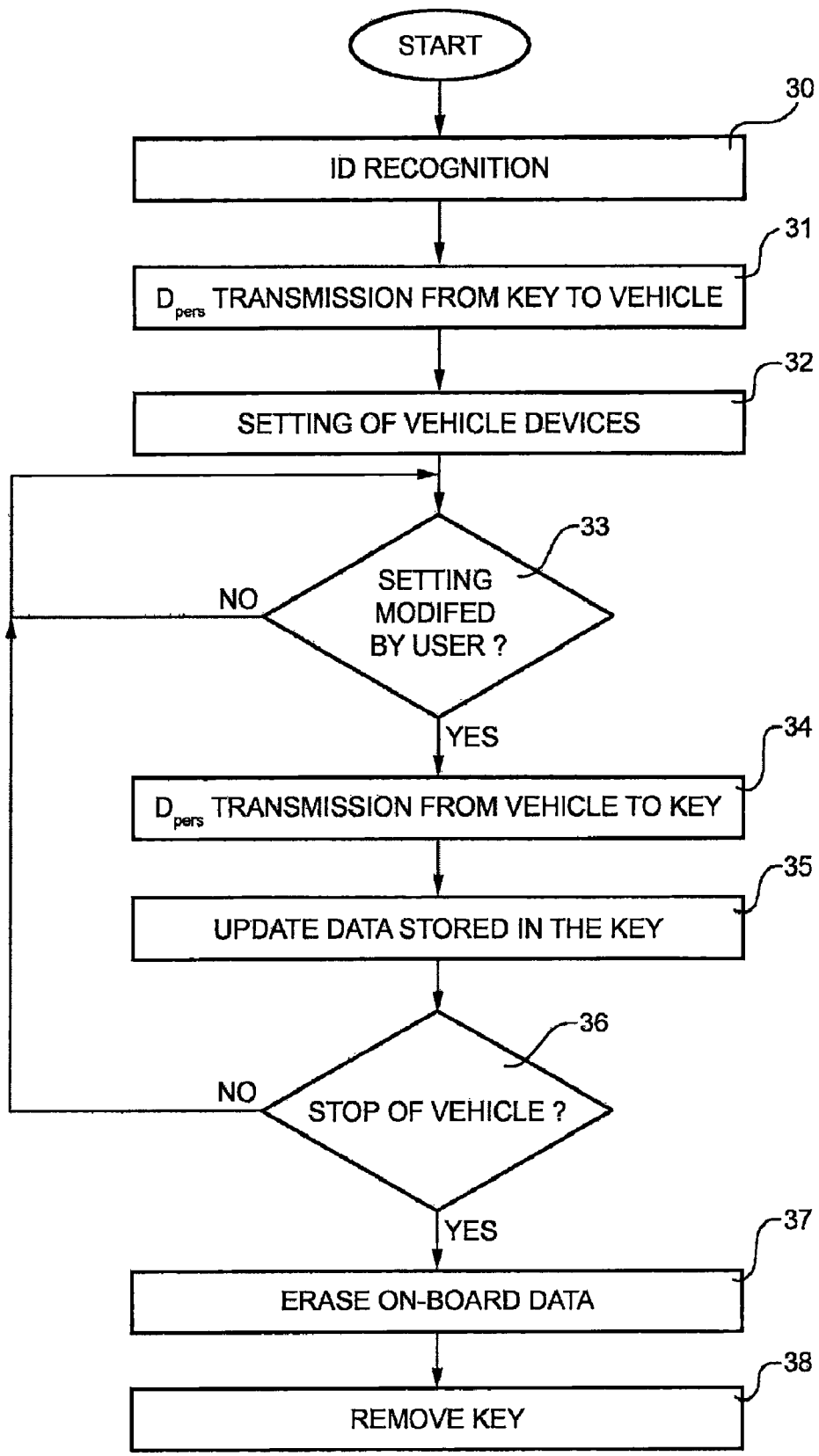
FIG. 3 is a flowchart related to operations performed in the vehicle utilization system.

The exemplary methodology shown in FIG. 3 will now be described. After the enabling code $C_{id}$ corresponding to a particular vehicle 3 has been correctly identified by the processing unit 9 and use of the vehicle is enabled (step 30), personal data $D_{pers}$ stored in the memory 5 of the electronic key 2 in association to that particular enabling code $C_{id}$ is transferred from the electronic key 2 to the processing unit 9 on-board the vehicle 3, via the wireless communication link 20 (step 31).

Figure 4:
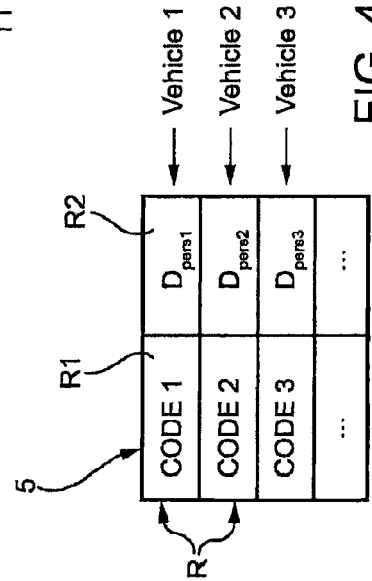
FIG. 4 shows schematically the internal structure of a portion of a memory of an electronic key in the vehicle utilization system.

As shown in FIG. 4, exemplary memory 5 of the electronic key 2 may conveniently store a database of enabling codes $C_{id}$ and personal data $D_{pers}$, that are associated to the on-vehicle devices. In particular, each record R of the database corresponds to a particular vehicle 3, whose use the electronic key 2 is adapted to enable, and includes a first field R1 storing the enabling code $C_{id}$ for that vehicle 3, and a second field R2 storing the personal data $D_{pers}$ related to the personal preferences of the user with respect to the same vehicle 3. Memory 5 may be any type of known storing means, like Flash memory (e.g. in the form of SD—Secure Digital—cards).

Referring again to FIG. 3, personal data $D_{pers}$ received by the processing unit 9 from the electronic key 2 are then communicated to the various adjustable on-vehicle devices, so as to cause adjustment thereof according to the user preferences (step 32); in particular, suitable data and commands are transmitted from the processing unit 9 to the control units of the various devices via the communication bus 24.

Moreover, according to a particular aspect of the disclosed exemplary embodiment, when the user, within the vehicle 3, modifies the setting of the same on-vehicle devices (e.g. sets a new radio station for radio 22 or a new preference address for satellite navigation system 23, or else modifies the inclination of the back of the seat 16) (step 33), the modified settings, reflecting the latest adjustments made by the user on the adjustable devices, are communicated from the on-vehicle devices to the processing unit 9, via the communication bus 24; afterwards, corresponding data is transmitted by the transmitter 8 directly to the receiver 6 of the electronic key 2 (step 34). However, if at step 33 no settings are modified, the system merely waits until the user does modify the settings.

Once the settings are modified, they are stored in the memory 5 of the electronic key 2, under the supervision of the microprocessor circuit 7, thus updating the personal data $D_{pers}$ associated to the vehicle 3 (step 35) (transceiver 6 is used in this case as a receiver). As shown in setp 36, each time the user adjusts the settings, the adjusted settings are then re-stored into the key 2. This process continues until the engine is stopped. Accordingly, the updating process is fully automatic, in real-time, and does not require any user intervention (after the settings have been adjusted at step 33), or any external intervention.

When the vehicle is arrested (i.e., the engine is shut off) at step 36, conveniently, all user personal setting data in the vehicle 3, associated to the various adjustable devices, are deleted (step 37) before the electronic key 2, which now has stored thereon all the latest settings of the same devices (i.e. as last modified by the user of the vehicle), is removed from the vehicle 3 (step 38).

In another exemplary embodiment, updating of the personal data $D_{pers}$ stored in the electronic key 2 is carried out only once, after the vehicle has been arrested (step 37), instead of being implemented in real-time as previously described, each time the settings are modified by the user.

Also, in this exemplary embodiment, personal information is not retained in the vehicle 3, so as to comply with the user's privacy, but instead is retained (with the latest modified preference settings) in the electronic key 2 personal to the user, so that the same user will be able to use the same settings when he/she next uses the same vehicle 3. In other words, the electronic key 2, personal to the user, is always complete with the enabling codes $C_{id}$ for the vehicles the user is authorized to use, and the personal data $D_{pers}$ associated to the preference settings of the related on-board adjustable devices (such as preferred radio stations, telephone contact lists, navigation preferred destinations, music files and any other information for services subscribed by the user).

According to yet another exemplary embodiment, the settings of the on-vehicle devices, when modified by the user during driving of the vehicle 3 are not stored within the same devices, but are only stored directly in the memory 5 of the electronic key 2; in this case, the on-vehicle devices may directly access the electronic key 2 (via the communication chain including bus 24, processing unit 9 and communication link 20) for retrieving user personal information. In this manner, no sensible data is stored inside the vehicle 3 (so that step 37, and the related erasing operation, of the previously discussed algorithm may not be present). However, in the alternative, the user's data may be stored on the vehicle as would be understood by one ordinarily skilled in the art having the benefit of this disclosure.

Moreover, according to another embodiment, the user/driver is able to protect the information stored in the electronic key 2 with a password (or other suitable security code). In this case, without the required password, the electronic key may be used to drive the vehicle 3, but without having access to the personal information $D_{pers}$ stored therein; this allows to avoid any risk of sharing of personal information.

The advantages of the present invention will be clear from the foregoing description. In particular, the electronic key according to the invention is obviously fully independent of any particular vehicle or vehicle identification code, by being reprogrammable. Once programmed, in fact, the key permits use of a potentially unlimited number of vehicles, by simply memorizing in the electronic key a new enabling code obtained by processing the identification code of any vehicle.

The user can therefore use any vehicle by means of a single personal electronic key, complete at all times with personal preference and setting data relating to the same vehicle. At any given time, the same electronic key may also be enabled to use a plurality of vehicles, each with a different authorization level, which may be associated with the relative enabling code; the electronic key may also store personal data for each of the vehicles. In short, the electronic key becomes personal, by relating to the user as opposed to a given vehicle and being complete with user personal data and information, and universal, by permitting use of any vehicle by simply storing an appropriate enabling code in the electronic key.

The utilization system according to the invention clearly allows running vehicle fleets, or car-sharing networks, easily and efficiently. Moreover, the user need not replace the personal key when purchasing a new vehicle or, for any reason, using a vehicle other than his/her own.

Vehicle access is also simplified in the event the personal key is lost. In which case, the user need simply report the vehicle data to an authorized dealer; on the basis of the vehicle data, the vehicle identification code can be traced by data bank access; and an enabling code obtained by processing the identification code can simply be stored in a "virgin" electronic key. Clearly, changes may be made to the system as described and illustrated herein without, however, departing from the scope of the present invention as defined in the accompanying Claims. In particular, the electronic key according to the invention may obviously be of any form and structure other than those described. Personal data $D_{pers}$ relating, for example, to adjustment of the driver's seat or rearview mirrors may be indirect data, in the sense of relating to physical parameters of the user (such as height, arm length, etc.), so that the actual parameters by which to set some of the adjustable devices on different vehicle models can be determined on the basis of the indirect data stored in electronic key 2.

Though the description is based entirely on wireless communication between the electronic key and on-vehicle enabling device, connecting means may be used to interface the electronic key with the on-vehicle enabling device (e.g. in the form of a connector for insertion of the electronic key). In which case, data is transmitted by electric contacts and a physical medium. In this case, the on-vehicle connecting means may conveniently be universal, i.e. for interfacing any electronic key. And again, a single standard employed by different vehicle manufacturers may be advantageous.

An exemplary embodiment of the present invention provides a vehicle utilization system permitting use of vehicles having respective identification codes, the system comprising a key housing a memory configured to store therein a first enabling code enabling use of a first vehicle; an enabling unit in the first vehicle configured to enable use of the first vehicle by the user in possession of the key, if the first enabling code stored in the key meets given conditions; and a programming unit configured to generate the first enabling code as a function of the identification code of the first vehicle by processing the identification code of the first vehicle, and to store the first enabling code in the key, wherein the memory is configured to store therein at least a second enabling code, in addition to the first enabling code, for enabling use of a second, different, vehicle usable by the user by means of the key, and generated by the programming unit as a function of a respective identification code of the second vehicle; and wherein the first vehicle has one or more respective adjustable devices, and the memory is configured to store personal data relative to personal settings of the one or more adjustable devices; the enabling unit in the first vehicle being configured to read the personal data from the memory to activate adjustment of the one or more adjustable devices, and to store in the memory a set of last personal settings of the one or more adjustable devices, reflecting adjustments made by the user on the one or more adjustable devices, thereby automatically updating the personal data in the key without any user intervention after the user has adjusted the one or more adjustable devices.

In another exemplary embodiment, the second vehicle has one or more respective adjustable devices, and the memory is configured to store personal data relative to personal settings of the one or more adjustable devices in the first and second vehicles, in association with the respective first and second enabling codes. In yet another, the memory includes at least a first and a second record; the first and second records including a first field storing the enabling code for the corresponding first and, respectively, second vehicle, and a second field storing the personal data for the one or more adjustable devices of the corresponding first and, respectively, second vehicle. In another exemplary embodiment, the key is provided with a processing circuit coupled to the memory, and the enabling unit in the first vehicle includes a processing unit; the processing unit being coupled to the one or more adjustable devices through a communication bus, so as to receive therefrom information related to the last settings, and being configured to transmit the information to the processing circuit in the key, thereby the processing circuit updates the personal data stored in the memory.

In yet another exemplary embodiment, the key is provided with a processing circuit coupled to the memory, and the enabling unit in the first vehicle is coupled to the processing circuit in the key via a short range wireless link. In another, the enabling unit in the first vehicle is configured to erase the user personal settings of the one or more adjustable devices, once use of the first vehicle is interrupted by the user. In yet another, the enabling unit is configured to activate adjustment of the one or more adjustable devices, only upon provision of a security code by the user. In another exemplary embodiment, the key is a personal key of the user. In another, the key is a universal key. In yet another exemplary embodiment, the enabling unit is configured to read the enabling code stored in the key. In another, the programming unit is configured to generate a number of different enabling codes as a function of the same identification code.

In yet another exemplary embodiment, the one or more adjustable devices comprise at least one device selected from the group consisting of an automatic driver's seat, an air conditioning system, an automatic rearview mirror, a car radio, a satellite navigation system, and a cellular communication system. In yet another, the programming unit is configured to set an authorization level for use of the first vehicle, associating with the enabling code additional data relative to the set authorization level; and the enabling unit is configured to permit use of the first vehicle by the user in accordance with the additional data. In another embodiment, the key includes a data transmission unit for transmitting at least the enabling code; and the enabling unit comprises: a data receiving unit for receiving the data transmitted by the data transmission unit; a processing unit configured to process the received enabling code; a comparing unit configured to compare the processed enabling code with the identification code; and an actuating unit, responsive to the comparing means, configured to enable use of the first vehicle, if the processed enabling code matches the identification code. In the alternative, the programming unit comprises an encryption stage configured to encrypt of the enabling code; and the processing unit comprises a decryption stage configured to decrypt the received enabling code.

In another exemplary embodiment, the encryption employs a public key and a private key. In yet another, the data receiving unit and the data transmission unit comprise radio-frequency transceivers. In yet another, the programming unit is implemented in a Personal Digital Assistant. In another, the key is in the form of a USB key.

An exemplary methodology of the present invention provides a method for vehicle utilization by a user, the method comprising the steps of (a) utilizing a portable key having a first enabling code corresponding to a first vehicle; (b) gaining access to the first vehicle after the enabling code has been verified, the user thereby entering the first vehicle; (c) adjusting settings of one or more devices in the first vehicle by the user; and (d) storing the adjusted settings in the portable key while the user is still inside the first vehicle, the storing being accomplished without the user having to perform any further intervention after the adjustment in step (c). In another methodology, the method further comprises the steps of re-adjusting the settings of the one or more devices in the first vehicle; and re-storing the re-adjusted settings in the portable key while the user is still inside the first vehicle, the storing being accomplished without the user having to perform any further intervention after the re-adjustment of the one or more devices. Another exemplary methodology further comprises the steps of removing the portable key from the first vehicle; stopping the first vehicle; returning the portable key to the first vehicle; communicating the re-adjusted settings of the one or more devices from the portable key to the first vehicle; and adjusting the one or more devices to the re-adjusted settings, the adjusting being accomplished without the user having to perform any intervention after the portable key has re-entered the first vehicle.

In yet another exemplary methodology, the method further comprises the step of utilizing the portable key to gain access to and adjust device settings of a second vehicle. In another, the one or more adjusted and re-adjusted settings comprise at least one of a driver's seat setting, an air conditioning setting, a mirror setting, a car radio setting, a satellite navigation system setting, or a cellular communication system setting.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A vehicle utilization system permitting use of vehicles having respective identification codes, the system comprising:
   a key housing a memory configured to store therein a first enabling code enabling use of a first vehicle having an identification code;
   an enabling unit in the first vehicle configured to enable use of the first vehicle by the user in possession of the key, if the first enabling code stored in the key meets given conditions; and
   a programming unit configured to generate the first enabling code as a function of the identification code of the first vehicle by processing the identification code of the first vehicle, and to store the first enabling code in the key,
   wherein the memory is configured to store therein at least a second enabling code, in addition to the first enabling code, for enabling use of a second, different, vehicle usable by the user by means of the key, and generated by the programming unit as a function of a respective identification code of the second vehicle; and
   wherein the first vehicle has one or more respective adjustable devices, selected from the group comprising an automatic driver's seat, an air conditioning system, an automatic rearview mirror, a car radio, a satellite navigation system, and a cellular communication system, and the memory is configured to store a first personal data relative to personal settings of the one or more adjustable devices of the first vehicle; the enabling unit in the first vehicle being configured to read the first personal data from the memory to activate adjustment of the one or more adjustable devices, and to store in the memory a set of last personal settings of the one or more adjustable devices, reflecting adjustments made by the user on the one or more adjustable devices, thereby automatically updating the first personal data in the key without any user intervention after the user has adjusted the one or more adjustable devices;
   wherein the second vehicle has one or more respective adjustable devices, selected from the group comprising an automatic driver's seat, an air conditioning system, an automatic rearview mirror, a car radio, a satellite navigation system, and a cellular communication system, and the memory is configured to store a second personal data, different from the first personal data, relative to personal settings of the one or more adjustable devices in the second vehicle, the first and second personal data being stored in a database in association with the respective first and second enabling codes of the first and second vehicles; and
   wherein the database includes at least first and second records that include respective first fields storing the first and, respectively, second, enabling codes for the corresponding first and, respectively, second vehicles, and respective second fields storing the first and, respectively, second personal data for the one or more adjustable devices of the corresponding first and, respectively, second vehicles.

2. A system as defined in claim 1, wherein the key is provided with a processing circuit coupled to the memory, and the enabling unit in the first vehicle includes a processing unit, the processing unit being coupled to the one or more adjustable devices through a communication bus, so as to receive therefrom information related to the last settings, and being configured to transmit the information to the processing circuit in the key, thereby the processing circuit updates the personal data stored in the memory.

3. A system as defined in claim 1, wherein the key is provided with a processing circuit coupled to the memory, and the enabling unit in the first vehicle is coupled to the processing circuit in the key via a short range wireless link.

4. A system as defined in claim 1, wherein the enabling unit in the first vehicle is configured to erase the user personal settings of the one or more adjustable devices, once use of the first vehicle is interrupted by the user.

5. A system as defined in claim 1, wherein the enabling unit is configured to activate adjustment of the one or more adjustable devices, only upon provision of a security code by the user.

6. A system as defined in claim 1, wherein the key is a personal key of the user.

7. A system as defined in claim 1, wherein the key is a universal key.

8. A system as defined in claim 1, wherein the enabling unit is configured to read the enabling code stored in the key.

9. A system as defined in claim 1, wherein the programming unit is configured to generate a number of different enabling codes as a function of the same identification code.

10. A system as defined in claim 1, wherein the programming unit is configured to set an authorization level for use of the first vehicle, associating with the enabling code additional data relative to the set authorization level; and the enabling unit is configured to permit use of the first vehicle by the user in accordance with the additional data.

11. A system as defined in claim 1, wherein the key comprises a data transmission unit for transmitting at least the enabling code, the enabling unit comprises a data receiving unit for receiving the data transmitted by the data transmission unit a processing unit configured to process the received enabling code; a comparing unit configured to compare the processed enabling code with the identification code; and an actuating unit, responsive to the comparing means, configured to enable use of the first vehicle, if the processed enabling code matches the identification code.

12. A system as defined in claim 11, wherein the programming unit comprises an encryption stage configured to encrypt of the enabling code; and the processing unit comprises a decryption stage configured to decrypt the received enabling code.

13. A system as defined in claim 12, wherein encryption employs a public key and a private key.

14. A system as defined in claim 11, wherein the data receiving unit and the data transmission unit comprise radio-frequency transceivers.

15. A system as defined in claim 1, wherein the programming unit is implemented in a Personal Digital Assistant.

16. A system as defined in claim 1, wherein the key is in the form of a USB key.

* * * * *